United States Patent [19]
Holland

[11] Patent Number: 6,044,040
[45] Date of Patent: Mar. 28, 2000

[54] WIDE-AZIMUTH, RADIALLY-DIRECTED SEISMIC DATA ACQUISITION METHOD

[75] Inventor: Mark Holland, Missouri City, Tex.

[73] Assignee: Input/Output, Inc., Stafford, Tex.

[21] Appl. No.: 09/159,215

[22] Filed: Sep. 23, 1998

[51] Int. Cl.$^7$ ........................................................ G01V 1/20
[52] U.S. Cl. ................................ 367/56; 367/72; 181/111
[58] Field of Search .................................. 367/73, 21, 72, 367/56, 58, 53, 63, 59, 37, 38; 181/112

[56] References Cited

U.S. PATENT DOCUMENTS

| | | |
|---|---|---|
| 4,567,582 | 1/1986 | Kuhn ........................................... 367/56 |
| 4,679,174 | 7/1987 | Gelfand . |
| 4,803,668 | 2/1989 | Berryhill et al. .......................... 367/72 |
| 4,835,745 | 5/1989 | Young et al. .............................. 367/56 |
| 4,926,393 | 5/1990 | McClellan et al. . |
| 4,969,130 | 11/1990 | Wason et al. . |
| 5,170,377 | 12/1992 | Manzur et al. ............................ 367/73 |
| 5,307,268 | 4/1994 | Wang et al. . |

OTHER PUBLICATIONS

Technology Alliance Improves 3D Seismic Survey Design in Egypt's Western Desert, Oil & Gas Journal, Jun. 1, 1998, Section: New Images of the Subsurface, p. 48.

Primary Examiner—Christine K. Oda
Assistant Examiner—Anthony Jolly
Attorney, Agent, or Firm—Haynes and Boone, LLP; Todd Mattingly; Tim Headley

[57] ABSTRACT

A method of acquiring seismic data locates a central position above a peaked stratigraphic subsurface. The method then positions receiver lines radially out from the central position, angularly displaced relative to one another, at equal intervals, throughout an entire circle. The method then positions shot lines between and transverse to the receiver lines. The method can also change the circle to the shape of an ellipse. For an ellipse, the receiver lines radiate from a point at the intersection of the major and minor axes of the ellipse. The receiver lines are more closely spaced about the end points of the major axis than about the end points of the minor axis. The shot lines are more closely spaced adjacent the end points of the major axis than adjacent the end points of the minor axis.

10 Claims, 2 Drawing Sheets

WIDE-AZIMUTH, RADIALLY-DIRECTED SEISMIC DATA ACQUISITION METHOD

BACKGROUND OF THE INVENTION

This invention relates to the acquisition of seismic data from subterranean formations, and in particular relates to the mapping of shots and receivers for efficient collection of data, for imaging dome-like geological formations.

The conventional pattern of shots and receiver stations for land-based 3D seismic imaging is orthogonal. In an orthogonal brick pattern, several receiver lines are laid out in at spaced intervals generally parallel to one another, and shot lines are laid out in a pattern of lines generally at right angles to the receiver lines. Receiver stations are generally evenly spaced along the receiver lines, and shot stations are generally evenly spaced along the shot lines. An alternate pattern is known as a zig zag, where shot lines cross the receiver lines at angles other than right angles.

When the orthogonal pattern technique is used to plan a survey over a target that includes steeply dipping geological formations, such as salt domes, a significant percentage of the data from the orthogonally patterned survey must be discarded or ignored, including data received by sensors on the opposite side of the dome from where the shots were fired, and data representing signal paths having offsets too long to be meaningful.

One approach to solving the problem of the unsuitability of an orthogonal pattern for imaging salt domes involves mapping receiver lines radially from a point above the center of the dome, and mapping shot or seismic source lines on those same radial lines. To provide more density of shots further away from the center of the dome, over the steeply dipping areas of the target, which are of most interest, the radial method adds more radially-oriented shot lines, beginning some distance away from the center of the dome.

This radial approach has several drawbacks that make it economically impractical. First, there are too many shots and receiver stations located over the shallowest section of the dome—an area of little prospecting interest. Second, the radial approach yields a poor distribution of offsets, i.e. a narrow range of distances between any given source point and an active receiver. This poor distribution of offsets leads to a poor distribution of midpoints, if normal orthogonal bins are used. For this reason, some have tried using unequal bin sizes to provide more midpoints within a bin. The unequal bin sizes require complex mathematics to map bins for migrating data for imaging. Even with this added mathematical complexity, a much larger number of shots than those that would be required for coverage of a particular target using the orthogonal pattern are required, and the fold still does not compare favorably with orthogonal patterns. In addition, changing shot locations from the positions called for in the pattern, or eliminating them, to accommodate surface topography, leads to more unusable data than even the orthogonal pattern.

Another drawback of combining radial shot lines with radial receiver lines is that it results in narrow range of azimuths, that is, a narrow range of directions from a source point to any active receiver. In general, wider ranges of azimuths provide superior image resolution.

What is needed is a pattern that maximizes useable data, and provides a high fold and a wide range of azimuths at a cost comparable to orthogonal survey patterns.

SUMMARY OF THE INVENTION

The method of the present invention acquires seismic data by a series of steps that include: locating a central position above a peaked stratigraphic subsurface; positioning receiver lines radially out from the central position, angularly displaced relative to one another; and positioning shot lines between and transverse to the receiver lines.

In another feature of the invention, the shot lines in the pattern of the invention are generally spaced from one another in a geometric pattern corresponding to the circumferential geometry of the dome. The angular spacing of receiver lines and radial spacing between shot lines can be non uniform to provide a high concentration of receiver stations where the flanks dip steeply at shallow depths and a high concentration of shots where the flanks dip steeply at deep depths. The pattern is preferably designed to maximize fold while providing a wide range of azimuths.

The method includes selecting the spacing between radially extending receiver lines, and the spacing between radially spaced shot lines, to provide an increased number of receiver stations above shallow, steeply dipping sections of the target, and an increased shot density above deep, steeply dipping sections of the target.

The invention is particularly suited for obtaining 3D seismic data of a geological formation having steep dips in more than one direction, extending down from a top surface.

DETAILED DESCRIPTION OF THE PREFERRED EMBODIMENT

Figure 1:
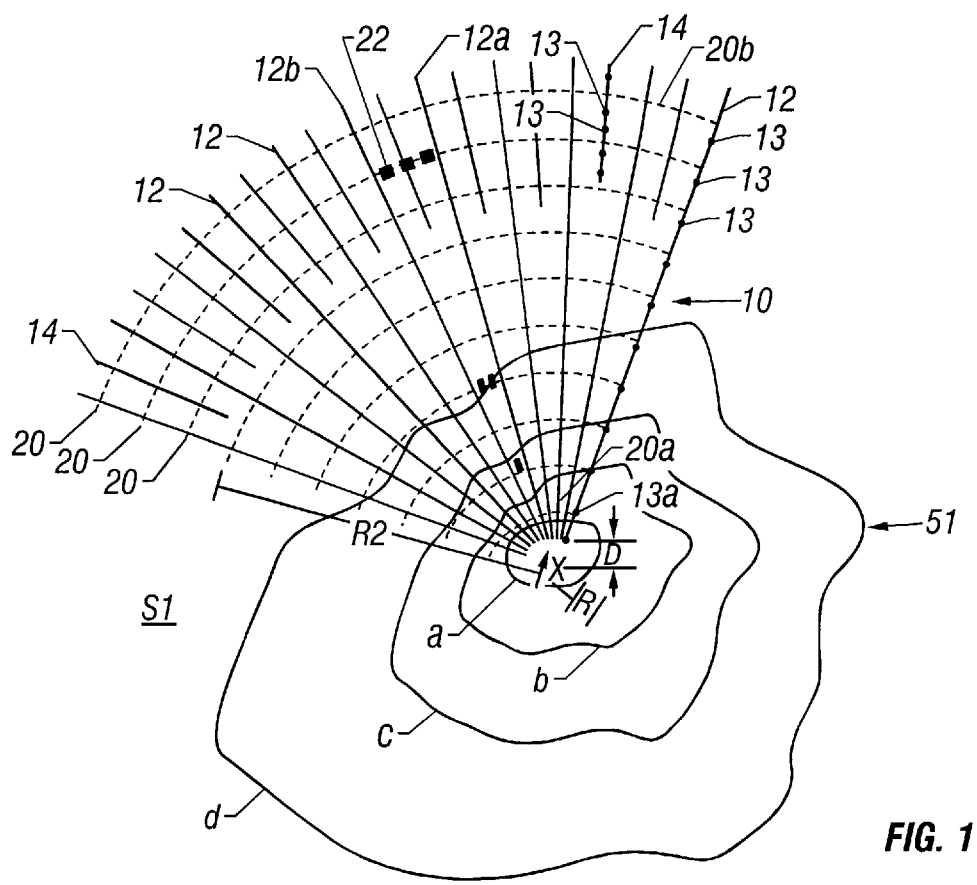
FIG. 1 is a plan view of a stratigraphic representation of a generally circular dome formation, overlaid with receiver and shot lines, according to the method of the invention.

FIG. 1 depicts a generally cylindrical salt dome S1, having a generally circular top surface. The dome S1 is a shallow, piercement type salt dome. The general structure and steepness of dip of the dome Si are shown in FIG. 1 by contour lines "a" through "d". The contour line "a" in FIG. 1 represents the circular boundary of the top surface of the dome S1. Moving out away from contour line "a" are the flanks of the dome, that is, the sides of the dome that dip. Each of the remaining contour lines b, c, and d represents the location of the boundary of the dome at 2000 foot depth increments. The dome S1 extends out from a center X a distance of about 4000 feet at the widest portion of its base, as indicated by contour line "d". The shape, contours, and depth of a salt dome within a seismic target area are predicted from previous petrophysical and/or 2D seismic surveys. The dome S1 has an upper, relatively flat top at a depth of about 2000 feet below the earth, and can be considered generally circular with a radius R1 of about 3300 feet.

A survey pattern 10, mapped in accordance with the invention, is depicted overlying the dome S1. The pattern 10 covers a quadrant of a circle drawn about the center X. The pattern 10 includes ten receiver lines 12 extending generally along radial lines from the center X, to form an array of receiver lines. Each of the receiver lines 12 is about four miles long, and includes receiver stations 13 spaced about 165 feet apart, which is a typical receiver station spacing for orthogonal surveys. Each receiver station includes a collection of geophones or sensors (not shown) that are summed to a single takeout. The receiver lines 12 begin at distance D from the center X, and are equally angularly spaced from one another by about ten degrees. Although each of the receiver lines 12 includes a plurality of receiver stations, for purposes of clarity in the drawing, only a few of the receiver stations 13 are shown in FIG. 1. It should be understood, in addition, that no attempt is made to present the pattern 10 in any scale. It should also be understood that the geophones or sensors within each of the receiver stations 13 can be any conventional seismic data receivers or sensors.

As the distance from the center X along the receiver lines 12 increases, the distance between the lines 12 increases, and thus the distance also increases between the receiver stations 13 on adjacent lines 12. Because the receiver stations 13 are equally spaced along each of the receiver lines 12, the number of sensors available to cover a particular subterranean area decrease as the distance away from the contour line "a" increases. As can be appreciated, it is appropriate to have a high concentration of receivers over the most steeply dipping portions of the target, and a low concentration over less steeply dipping portions.

It is, however, important to have a reasonable concentration and a relatively even distribution of receivers over the less steeply dipping portions of the target. While it is appropriate to have a higher concentration of receiver stations closer to the center of the dome S1, than closer to the deepest portion of the dome, i.e. adjacent contour line "d", there is still a need to have adequate receiver coverage over the entire dome S1. For this reason, in the pattern 10, nine short receiver lines 14 are placed between the receiver lines 12. The short receiver lines 14 also include equally spaced receiver stations 13. The short receiver lines 14 begin at a radial distance R2 from the center X. The radial distance R2 is at a point where the number of receiver stations over the dome flank would otherwise be fewer than the number that would occur in an orthogonal pattern. Together, the receiver lines 12 and 14 form an array of receiver lines.

The receiver lines 12 include a first receiver station spaced a distance of about 1,300 feet from the center X of the dome. Because it is wasteful to put receiver stations where shots, i.e. dynamite shots, will provide traces with little or no offset, the first receiver in each line is positioned where it will receive signals having an appropriate offset. A simple way of determining an appropriate placement of the first receiver station in a receiver line using the pattern 10 is to place it a distance D from the center X that is equal to the difference between radius R1 (3,300 feet) and the minimum depth of the dome (2,000 feet), that is, the distance between the plane in which the receivers will be placed and the plane containing the top surface of the dome. For this case, the distance D is 1,300 feet.

About nineteen shot lines 20, corresponding to the plane geometric shape of the dome top, are concentric circles, equal distances from one another, drawn about the center X, to provide acoustic signals for reflection and return to the sensors in the receiver stations 13 within the array of receiver lines.

The shot lines 20 begin with a shot line 20a at a distance of 2300 feet from the center X, at spaced intervals of 1000 feet, and ending with a shot line 20b at a distance of 23,000 feet from the center X. For the pattern 10 in FIG. 1, dynamite shot points 22 (indicated as small squares) are positioned along the shot lines 20 between the two innermost or primary receiver lines 12a and 12b. As with the illustration of the receiver stations 13, there are many more shot points 22 than shown in FIG. 1. The pattern 10 calls for seventy-three shot points along the innermost shot line 20a, between the primary receiver line 12a and the primary receiver line 12b. More than 800 shot points are mapped along the outermost shot line 20b, again between the two primary receiver lines 12a and 12b. For clarity of view in the drawing, only some of the shot lines are shown in FIG. 1. The nineteen shot lines 20 achieve a shot and receiver density comparable to that present in a conventional orthogonal mapping. The shot points 22 in the pattern 10 represent acoustic shots produced by an acoustic source such as dynamite. In the pattern 10, the shot points 22 are about 200 feet apart, along the shot lines 20. The shot source can be any suitable source for sending seismic waves or shots into a target formation. If a vibratory source is used, then the shots would actually be source stations where a collection of vibratory sweeps are produced that are summed together for a single shot record.

The pattern 10 of the present invention provides the desired shot and receiver density for good 3D imaging of the dome S1, which is characterized by a generally circular or cylindrical shape. In particular, the pattern 10 provides: (a) a high density of shots and receivers and a short, maximum useable offset needed for shallow sections of the dome, i.e. near its center; (b) a medium density of shots and receivers and a medium, maximum useable offset for medium depth sections of the dome; and (c) a low density of shots and receivers and a long maximum useable offset for deep sections of the dome. This "mapping" of the pattern 10 results in about 200 shot points for each 1600 receiver stations, which is fairly comparable to the number of shot points and receiver stations that would be required to cover a comparable surface area using an orthogonal pattern. The pattern of the invention, however, provides a significant increase in fold over a comparable orthogonal design, and more useable data.

The method of this invention is particularly well suited to be used with irregularly shaped salt domes. For example, for a generally elliptical dome, the method modifies the spacing between the receiver lines, and modifies the general pattern of the transverse shot lines, to provide a high percentage of shots and receivers over the steeply dipping ends of the ellipse, i.e. close to the ends of the major axis of the ellipse, while providing greater spacing between shots and receiver lines adjacent to the ends of the minor axis of the ellipse.

Figure 2:
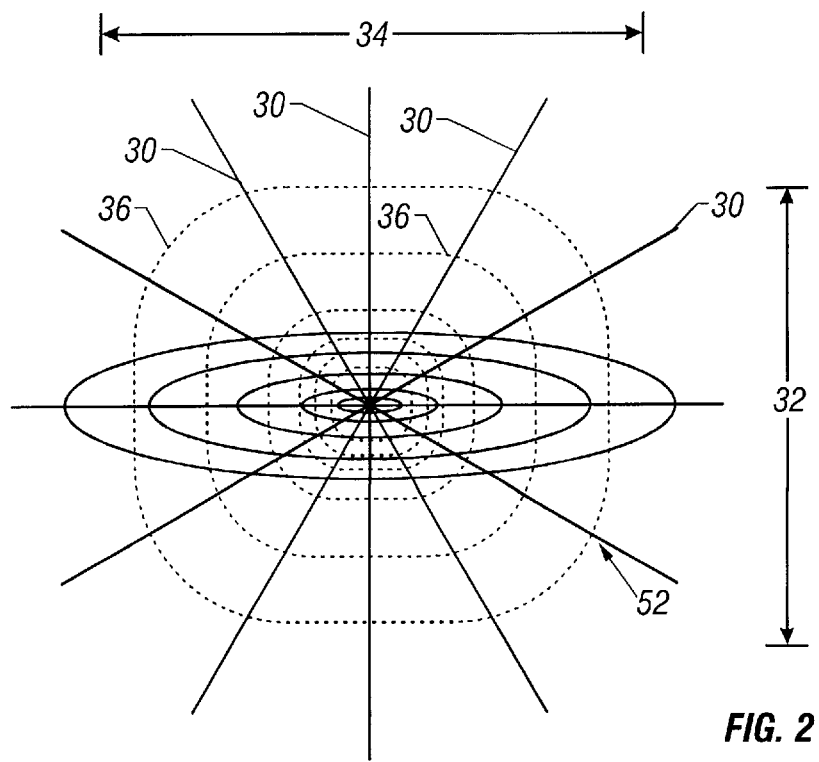
FIG. 2 is a plan view of a stratigraphic representation of a generally elliptical dome formation overlaid with receiver and shot lines, according to the method of the invention.

Referring now to FIG. 2, for an elliptical dome S2, radial receiver lines 30 are unevenly spaced so that there is a closer angular spacing between the lines 30 adjacent the ends of the major axis, e.g. in region 32, and a wider angular spacing between the lines 30 adjacent the ends of the minor axis, e.g. in region 34. Shot lines 36 are spaced closer together in the region 32 than in the region 34. The shot lines 36 generally follow the plane of the dome flank in the region 34, but are transverse to the dome flank in the region 32. This pattern follows from the goal of having the highest density of good midpoints over the most promising prospecting area of the target. To achieve this goal while making the shot line mapping sufficiently regular to be practical for workers to layout shots in the field, the shot lines are placed in a generally rounded, rectangular pattern, as shown, being more closely spaced along the major axis than along the minor axis.

Figure 3:
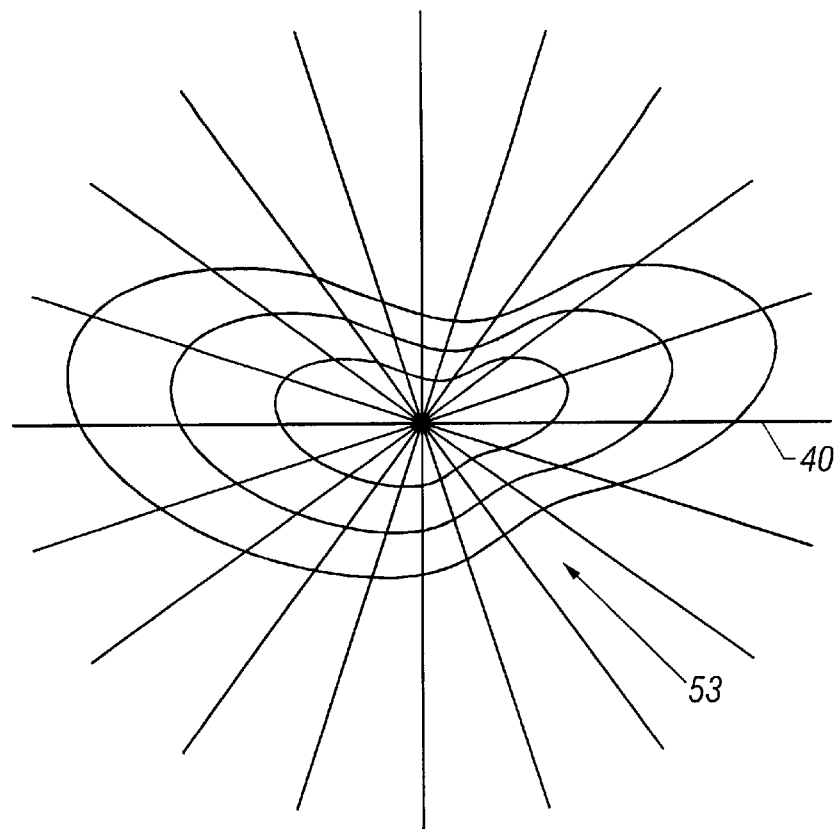
FIG. 3 is a plan view of a stratigraphic representation of a dome formation in the shape of a distorted oval.
Figure 3A:
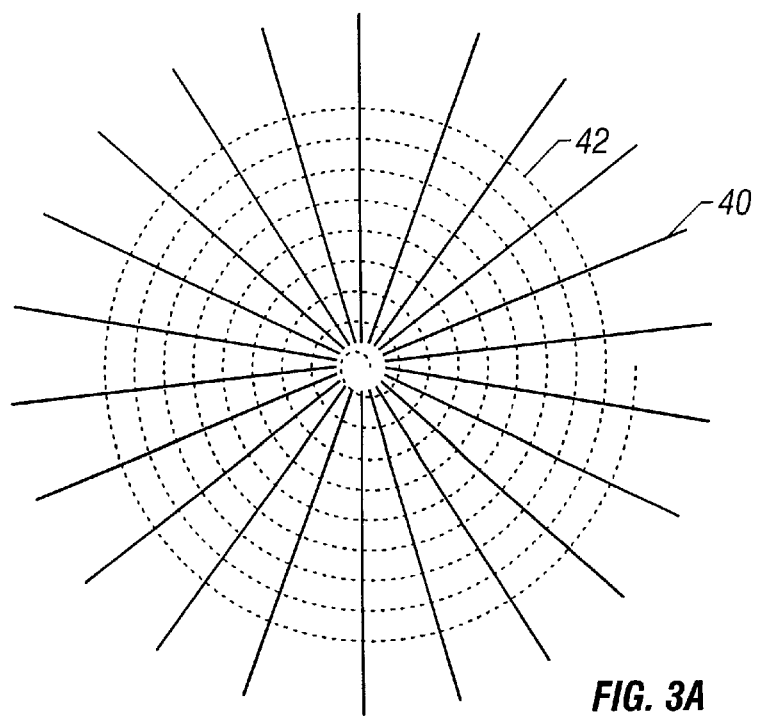
FIG. 3A is a plan view of a pattern of receiver and shot lines, according to the method of the invention, for the distorted oval shape illustrated in FIG. 3.

FIG. 3 shows another salt dome shape S3 which further illustrates the method of the present invention of concentrating radially extending receiver lines 40 above areas of steepest dip. Referring now to FIG. 3A, for the irregularly shaped dome S3, shot lines 42 are laid out in a continuous spiral, generally following the dome contour. With a spiral shot lay out, it is possible to gain an even better distribution of midpoints than with spaced circles or rectangles. As illustrated in FIG. 3A, the spiral shot lines 42 are still transverse to radial receiver lines 40, but have a longer length between each receiver line than would be the case with the shot lines shown in FIGS. 1 and 2.

The angles between receiver lines, and distance between shot lines, are determined in accordance with known principles of geophysical modeling. The shot lines are coarse where the formation changes depth quickly, and less course where the formation changes depth more gradually. The angles between receiver lines and distances between shot lines can be determined using the predetermined contour information, a budget for shots and receivers, and geophysical design packages such as the package sold under the trademark MESA by Green Mountain Geophysical of Boulder, Colo.

Another significant advantage of mapping receiver lines and shot lines to match the general shape of the target, in accordance with the method of the present invention, is that this mapping leads to data midpoints that are distributed over the entire mapped area, compared to the sparse and clustered distribution from a radial pattern. Regular, even-sized bins can therefore be used to migrate the data from a seismic shoot, and thus data quality is greatly improved over prior art patterns. In addition, the wide midpoint distributions in bins leave a great deal of latitude in repositioning or eliminating shots where the pattern would otherwise dictate, in places where the surface topography is such that it is difficult or impossible to place a shot source or receiver station.

The method of the present invention is not limited to any particular type of seismic signal source or receiver. Moreover, surface topography can affect the actual placement of receivers and shots for a particular target. Therefore, the method of the present invention is not limited to the placement of shots in precise arcs, or the placement of receivers in straight lines. Those terms as used in this description, and terms used in the following claims are used in the sense of mapping seismic shot sources and receivers for placement in the field. The scope of the invention is defined in the following claims.

What is claimed is:

1. A method of acquiring seismic data, comprising the steps of:
    a. locating a central position above a peaked stratigraphic subsurface;
    b. positioning receiver lines radially out from the central position, angularly displaced relative to one another; and
    c. positioning shot lines between and transverse to the receiver lines.

2. The method of claim 1, wherein the receiver lines are angularly displaced at intervals throughout an entire circumference of a first circle around the central position, and wherein the shot lines are positioned in arcs of circles concentric with the first circle.

3. The method of claim 2, wherein the intervals are equal.

4. The method of claim 2, wherein the first circle is an ellipse, the receiver lines radiate from a point at the intersection of the major and minor axes of the ellipse, the receiver lines are more closely spaced about the end points of the major axis than about the end points of the minor axis, and the shot lines are more closely spaced along the major axis than along the minor axis.

5. The method of claim 2, wherein the shot lines are more closely spaced over shallower portions of a structure underneath the stratigraphic subsurface.

6. A method of conducting a seismic survey of a target area including a dome-like subterranean formation, the method comprising:
    a. positioning a plurality of seismic signal receivers along a plurality of radial lines, the lines being angularly displaced from one another, and extending out from a point above the top surface of the dome-like formation, the plurality of radial receiver lines including a pair of centrally located primary receiver lines;
    b. positioning a plurality of seismic signal sources along a plurality of lines between and transverse to the primary receiver lines;
    c. activating certain ones of the receivers; and
    d. activating the signal sources for detection by the receivers of signals reflected from boundaries of the dome-like formation.

7. The method of claim 6 wherein the arrangement of positioned seismic signal receivers and seismic signal sources defines a pattern and the method further comprises rolling the pattern of receiver lines and source lines to a next adjacent sector of the target area such that the radial receiver lines extend from the point above the top surface of the dome-like formation.

8. The method of claim 6 further comprising repeating the positioning, receiver activating, signal activating and rolling steps until the entire target area has been covered.

9. A method of mapping a seismic survey over a salt dome target wherein the approximate shape of the perimeter of the dome's top surface has been determined from previously acquired geophysical data, the mapping method comprising:
    a. determining a geometric center of the dome's top surface perimeter;
    b. mapping seismic receiver lines along a plurality of spaced apart paths radiating out from the geometric center;
    c. mapping seismic source lines along a plurality of spaced apart paths transverse to the receiver lines;
    d. dividing the mapped area into patches, each patch including a plurality of receiver lines and the plurality of receiver lines includes a pair of adjacent primary receiver lines, the primary receiver lines being centrally located within the patch; and
    e. mapping seismic source points along the portions of the source line paths located between the primary receiver lines.

10. The method of claim 9 wherein the depth of earth above the dome's top surface has been determined from previously acquired geophysical data, wherein the seismic receiver lines include receiver stations, each station including a plurality of seismic sensors, the mapping method further comprising the step of mapping the first receiver station in each line to be spaced from the geometric center a distance approximately equal to the difference between the distance between the geometric center and the approximate depth of earth above the dome's top surface.

* * * * *